April 13, 1954     C. A. SIVER     2,675,016
TWO-WAY VALVE FOR COMPRESSED GAS
Filed Feb. 15, 1952
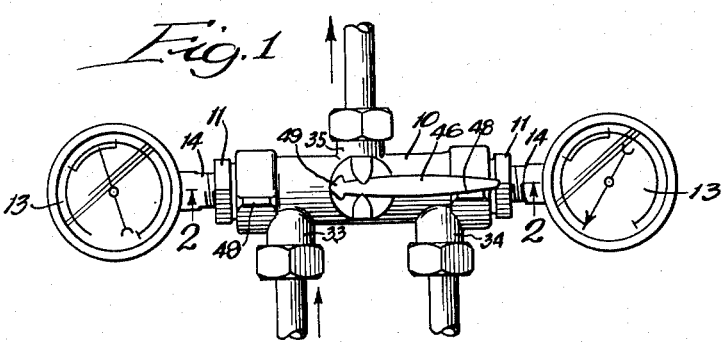
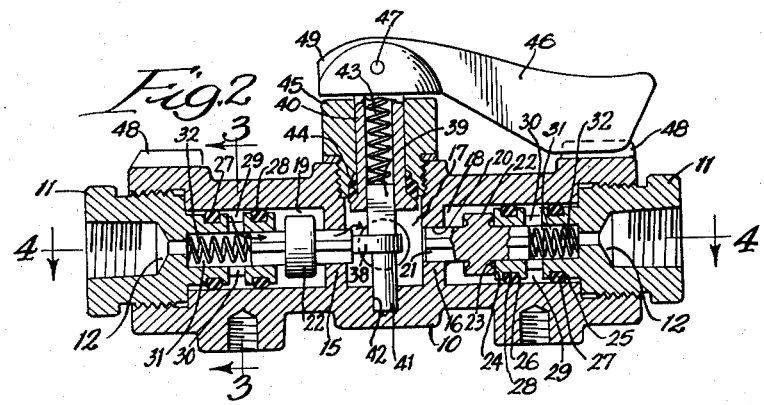
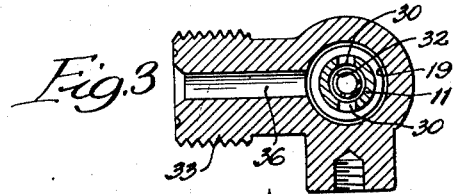
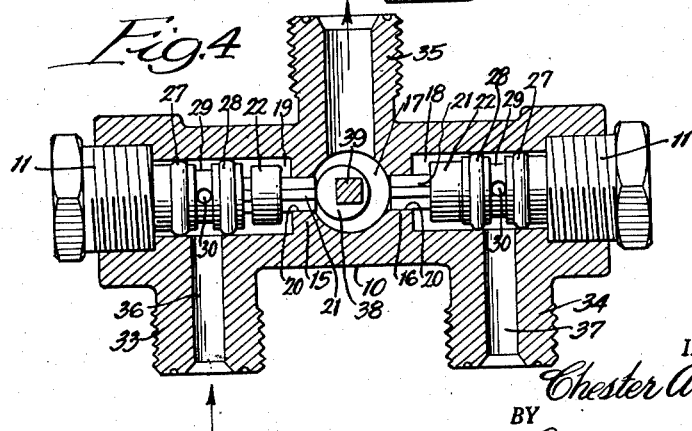
INVENTOR:
Chester A. Siver,
BY
Dawson & Ooms,
ATTORNEYS.

Patented Apr. 13, 1954

2,675,016

UNITED STATES PATENT OFFICE 2,675,016

TWO-WAY VALVE FOR COMPRESSED GAS

Chester A. Siver, Hinsdale, Ill., assignor to The Liquid Carbonic Corporation, Chicago, Ill., a corporation of Delaware Application February 15, 1952, Serial No. 271,767

6 Claims. (Cl. 137—112)

This invention relates to a two-way valve for compressed gas, and more particularly to a valve which enables changing or switching quickly from an empty drum of compressed gas to a full one.

In the medical profession, it is common to supply oxygen, nitrous oxide, etc., from drums to a patient and the operation is accomplished through manually-operated shut-off valves requiring a short interruption in the supply of gas during the change-over. This is not only undesirable, but in some cases the interruption may be serious. In the bottling industry, it is also important to quickly change from a line of empty drums of $CO_2$ to full ones. Other uses of compressed gas require a quick change, without substantial interruption, from empty to full drums.

An object of the present invention is to provide a structure of simplified construction which enables the quick changing or switching from an empty drum of compressed gas to a full drum. A further object is to provide a two-way valve for controlling the flow of compressed gas from a series of drums while automatically closing one inlet connected with drums while manually opening another inlet connected with other drums. A further object is to provide a valve structure which maintains a flow from a drum of compressed gas to an outlet while maintaining another inlet of the valve closed as a drum or series of drums are being disconnected from the latter and new drums substituted. A still further object is to provide a valve of unique construction useful for a variety of purposes. Other specific objects and advantages will appear as the specification proceeds.

The invention is illustrated by the accompanying drawing, in which—

Figure 1 is a broken side view in elevation of a valve structure embodying my invention; Fig. 2, a sectional view, the section being taken as indicated at line 2—2 of Fig. 1; Fig. 3, a transverse sectional view, the section being indicated by the line 3—3 of Fig. 2; and Fig. 4, a longitudinal sectional view, the section being taken as indicated at line 4—4 of Fig. 2.

In the illustration given, 10 designates a valve casing which provides a longitudinally-extending chamber, the outer ends of which are closed by threadably-connected plugs 11. A passage 12 extends longitudinally through the closures 11, and communicates with pressure gauges 13 which have pipes 14 threadably engaging threaded recesses in the closure plugs 11.

The casing 10 is provided centrally with a pair of spaced walls 15 and 16. The walls divide the interior of the valve body into a central chamber 17 and end chambers 18 and 19. Each of the walls 15 and 16 is provided centrally with a circular aperture 20 receiving a valve stem 21 which is generally star-shaped or in the shape of a Greek cross. Upon each of the stems 21 is mounted a valve 22 having on each face an annular groove 23 defining outer sealing surfaces 24. When the valve stem is moved inwardly, the surfaces seal against the wall 16 to prevent flow from chamber 19 through the aperture and into chamber 17.

The valves 22 may be formed of nylon or other suitable material.

The stem 21 may, if desired, be formed integrally with the valve disc 22, and extend outwardly therefrom. The closure or nozzle member 11 is provided with an inward extension providing two annular grooves 25 and 26 receiving the rubber O-rings 27 and 28, respectively. Between the O-rings, there is a recessed groove 29 recessed in the nozzle or closure extension and a cross drill or passage 30 connects the recessed groove 29 with the spring chamber 31. A spring 32 is located within chamber 31 and normally urges the valve stem 20 inwardly when the pressures on both sides of the valve 22 are substantially equal.

In the illustration given, the valve body 10 is provided with two inlet bosses 33 and 34 and with one outlet boss 35. The bosses may be threaded for connection with conduits. The conduits from the inlet bosses 33 and 34 lead to separate drums of compressed gas or to a series of separate drums which are connected together. The conduit from the outlet boss 35 leads to the point of use or application. As shown more clearly in Fig. 4, inlet passages 36 and 37 extend through the bosses 33 and 34, respectively, and communicate with the annular groove 29 and thence through the transverse passage 30 with the stems 21 which have longitudinally-extending flow passages or clearances between the stems and the nozzle or extension of closure members 11.

Within the central chamber 17 is a one-piece heart-shaped cam 38 adapted to contact selectively the valve stems 21 to open one of them when engaged by the high heart of the cam. Integrally formed with the cam 38 is a stem or shaft 39 which is machined square to fit into the square socket of stem 40. The lower shaft or cam extension 41 is machined round to fit a bearing recess 42 in the valve body 10. A spring 43 holds the cam in position and also causes stem 40 to bear against a packing ring 44. The high pressure of the gas produces a strong upward force acting on the stem 40 to bring about a positive setting between stem 40 and the packing ring 44. The stem 40 and the cam 38 are retained by the nut 45. The handle 46 is secured by pin 47 to the squared end of stem 40 so that turning handle 46 brings about a turning of cam 38. The handle is provided with stops 48 to limit the travel of the handle 46. The arrow 49 of the handle 46 points to the full drum side.

*Operation*

In the operation of the valve structure, the pressure reading on the pressure gauges indicates the contents of the separate gas drums communicating with inlets 36 and 37. By turning the handle 46 until it bears against the stop 48 on the valve body 10, the cam 38 is caused to move the valve stem 21 on the one side to unseat the valve 22 thereon (as illustrated in Fig. 2). The cam 38 holds the valve 22 open as long as the handle 46 is not moved. As the valve 22 shown on the left-hand side opens, as illustrated in Fig. 2, the other valve 22 is automatically closed by the pressure of the gas, which causes the latter valve to seal against the inner portion of the nozzle or closure member 11, as shown more clearly in Fig. 2. For example, if gas drums communicating with the inlet nozzle 37 are shut off or are empty, the pressure on the spring side of the valve is zero, or appreciably less than the pressure on the inner side of the valve, and hence the valve is moved to the sealing position illustrated in Figs. 2 and 4. Thus, when a drum is detached from the conduit communicating with the inlet boss 34 and replaced by another drum, the valve seals off the inlet passage 37 by being moved against the inner end of the boss or nozzle 11. On the other hand, when the full drum or drums communicating with the inlet 37 are opened (so that a quick change from empty to full drums can be made by turning handle 46), the pressure on both sides of the valve 22 at the righthand side of the casing is then the same and the only unbalanced force is that of spring 31 which presses the valve forwardly against the apertured wall 16 to seal the aperture and prevent the release of gas from the opened full drums.

The valves 22 thus are arranged for movement in two directions to effect a sealing either against the inner face of the nozzle or closure 11, or against the inner wall 16 or 15, while at the same time one of the valves may be opened selectively by the rotating of cam 38. The operator may connect or disconnect the drums, as desired, without bringing about a release of gas from the opened full drums until such release is desired.

By the above structure, it is possible to change or switch quickly from an empty drum of compressed gas to a full one so that no interruption occurs in the supply of gas as it travels from the drum to the point of use.

While, in the foregoing specification, I have shown a specific structure in considerable detail to illustrate one embodiment of the invention, it will be understood that such details of structure may be varied widely by those skilled in the art without departing from the spirit of my invention.

I claim:

1. In a structure of the character set forth, a valve casing providing a longitudinal bore and having spaced inner apertured walls dividing the bore into a central chamber and end chambers, closure nozzles closing the outer ends of said chambers and provided at their inner ends with recesses, a valve stem in each end chamber slidably mounted in said apertured wall and in the recess of said closure nozzle and movable for placing a valve carried thereon in sealing engagement with said wall and alternatively with the inner end of said nozzle, said stems being provided with longitudinal grooves permitting the free flow of gas therethrough and into said central chamber, inlets for supplying gas under pressure to each of the recesses in said nozzles, said valve casing providing an outlet communicating with said central chamber, springs in the recesses of said nozzle closures urging said valve stems inwardly toward said central chamber and effective when the pressure on each side of the valve is balanced, for moving the valve inwardly into sealing engagement with the inner casing wall, and manual means for selectively moving one of said stems to unseat the valve thereof from seating engagement with the apertured wall associated therewith.

2. A valve for compressed gases, comprising a valve body providing a longitudinally-extending bore, spaced apertured walls dividing said bore into a central chamber and end chambers, nozzles closing said end chambers and provided at their inner ends with recesses, valve stems received within said recesses and within the aperture of said walls for sliding movement, said stems being provided with longitudinal grooves to permit the free flow of gases therethrough and into said central chamber, a valve carried by each stem and adapted to seal the aperture of said wall when pressed thereagainst and the recess of said nozzle when pressed thereagainst as a result of a differential in gas pressure, handle-equipped cam means for moving said stem selectively to unseat the selected valve, and spring means within each nozzle bearing against the stem to urge it into sealing relation with the apertured wall to seal the flow of gas into the central chamber only when the pressure on both sides of the valve is balanced and also when the pressure on the outer side of the valve is at least substantially equal to a pressure exerted against the inner side thereof.

3. A valve for compressed gases, comprising a casing providing a longitudinal passage and spaced inner walls dividing the passage into a central chamber and end chambers, nozzles closing the ends of said end chambers and providing within each end chamber spaced sealing surfaces between which extends an inlet annular groove, said casing being provided with inlets on each side communicating with the annular groove of each nozzle, an outlet fitting communicating with the central chamber, a stem in each of said end chambers guided for longitudinal movement within said spaced walls of the casing and within recesses in said nozzles, said stems providing clearance spaces between them and said guides to permit the flow of gas therethrough, a valve on each of said stems adapted to seal against said inner wall or against said nozzle to check the flow of gas, a spring in each of said nozzles urging the stem inwardly, a cam within said central chamber adapted to bear selectively against one of said stems to unseat the valve thereof, and a handle for rotating said cam, each of said valves being operative to seat against the associated nozzle when uninfluenced by said cam and when the pressure within said central chamber exceeds the pressure of the fluid within the nozzle to check the flow of gas therefrom, each of said valves also being operative to seat against the associated inner wall when uninfluenced by said cam and when the pressure within the nozzle is at least substantially equal to the pressure in said central chamber.

4. A valve for the control of flow of compressed gases, comprising a casing providing a longitudinally-extending bore and having inner apertured walls dividing the bore into a central chamber and end chambers, a cam mounted for rotation in said central chamber, handle means for rotating said cam, closures for the ends of said end chambers and provided at their inner ends with recesses, inlet means for establishing communication between compressed gas sources and said recesses, sealing means about the inner end of each closure member, a valve stem slidably mounted in each apertured wall and within the recess of the corresponding closure member, a valve on each of said stems, and spring means within said recess arranged with said valve stem to move it inwardly and into the central chamber, said stem being engageable with said cam to bring about an unseating of the valve, said valve, upon release from said cam, being movable under the influence of pressure against the inner end of the closure member to seal the same, and under the influence of superior pressure on the other side to move against the apertured wall to seal the same against the outflow of gas into the central chamber.

5. A compressed gas control valve, comprising a casing having a longitudinally-extending bore and having inner apertured walls dividing the bore into a central chamber and end chambers, a closure nozzle at each end of the end chambers and provided with a longitudinal passage therethrough, pressure gauges secured to said closure members and communicating with the passage therethrough, said closure members being provided at their inner ends with recesses and with spaced sealing surfaces, said spaced sealing surfaces providing between them an annular groove, inlet passages communicating with said annular groove, said closure members providing a passage extending between said annular groove and the recess of the closure member, a spring mounted in each closure recess, a valve stem having radial portions extending outwardly into sliding engagement with the closure walls dividing said recess and in engagement with the apertured inner walls, a valve carried by each stem and movable into engagement with the inner wall to seal the same and into engagement with the end of the closure member to seal the flow of gas from the spring recess toward said central chamber, and cam means mounted within said central chamber and engageable with the ends of said stems for moving one selectively for the unseating of the valve thereon.

6. A control valve for relatively high pressure fluid flow systems and adapted to connect selectively either of two high pressure fluid sources to a supply line while automatically checking the flow of fluid from the other source, comprising a casing providing a longitudinally-extending passage therethrough and having spaced-apart inner walls dividing said passage into a central chamber and end chambers, each of said inner walls having an opening therethrough providing communication between said central and end chambers, said casing having an outlet communicating with said central chamber and inlets communicating with said end chambers, a closure member at the outer end of each end chamber, a sealing member in each of said end chambers intermediate said inlets and said central chamber and provided with an aperture therethrough, a valve movably mounted in each of said end chambers for selective sealing engagement with said inner wall and said sealing member to check the flow of fluid into said central chamber, means for biasing each of said valves toward sealing engagement with said inner walls, and manually operable means for selectively moving either of said valves from sealing engagement with said inner walls, each of said valves being operative to seat against the associated sealing member when uninfluenced by said cam and when the pressure within said central chamber exceeds the pressure of the fluid at the inlet of the end chamber to check the flow of gas therefrom, each of said valves also being operative to seat against the associated inner wall when uninfluenced by said cam and when the pressure within the end chamber is at least substantially equal to the pressure in said central chamber.

References Cited in the file of this patent

UNITED STATES PATENTS

| Number | Name | Date |
|---|---|---|
| 928,732 | Benwitz | July 20, 1909 |
| 2,075,600 | Baker | Mar. 30, 1937 |